UNITED STATES PATENT OFFICE.

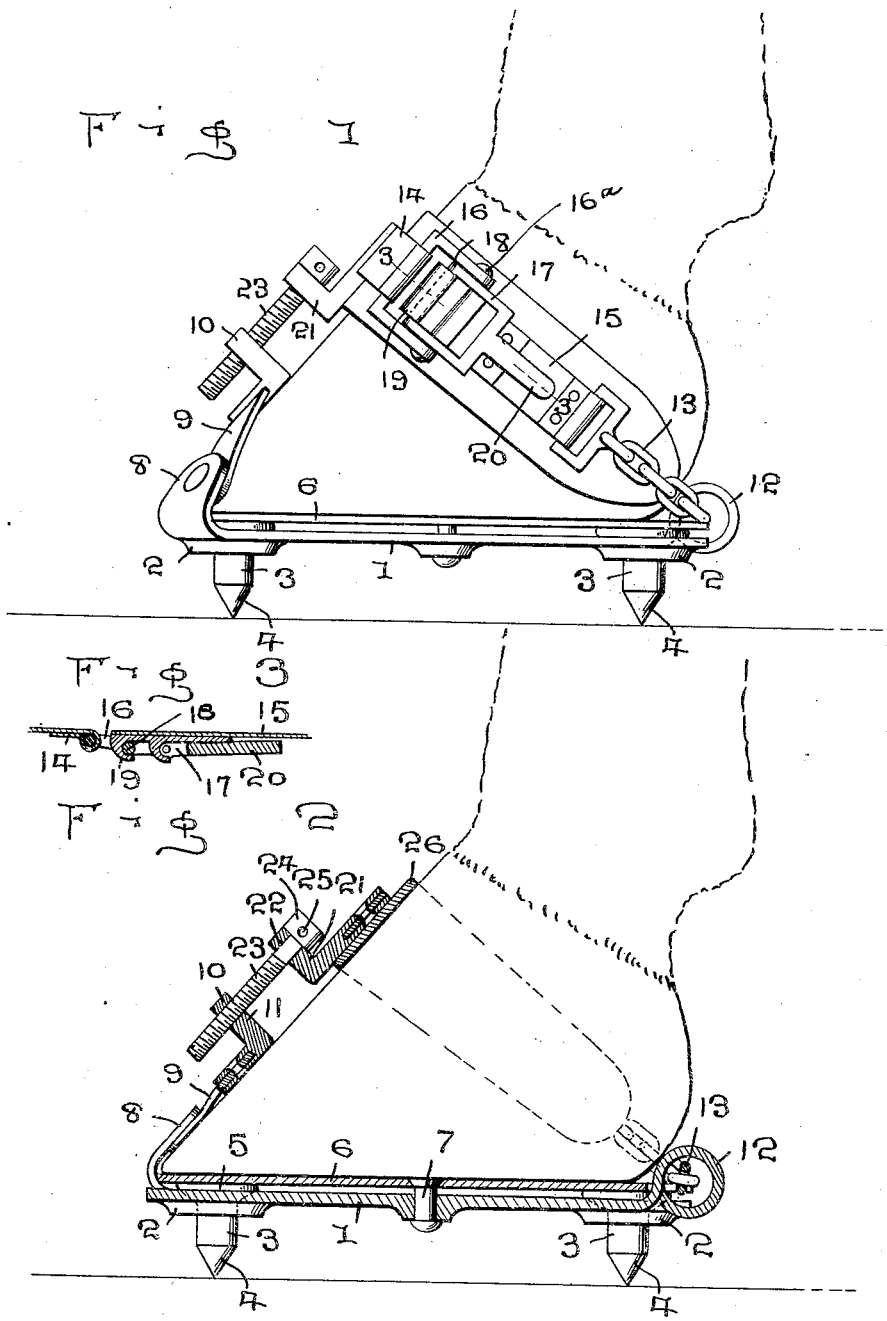

CHARLES F. HYATT AND EDWARD W. MESSMER, OF INDIANAPOLIS, INDIANA.

HORSESHOE.

No. 929,950.      Specification of Letters Patent.      Patented Aug. 3, 1909.

Application filed February 16, 1909. Serial No. 478,160.

*To all whom it may concern:*

Be it known that we, CHARLES F. HYATT and EDWARD W. MESSMER, citizens of the United States, residing at Indianapolis, in the county of Marion and State of Indiana, have invented certain new and useful Improvements in Horseshoes; and we do hereby declare the following to be a full, clear, and exact description of the invention, such as will enable others skilled in the art to which it appertains to make and use the same.

Our invention relates to new and useful improvements in horse shoes and our object is to provide a shoe of this class which may be attached to the hoof of an animal without the employment of the usual form of nails.

A further object is to provide means for removably attaching the shoe to the hoof.

A still further object is to provide means for attaching calks to the shoes and a still further object is to provide a resilient plate to receive the hoof of the animals.

Other objects and advantages will be hereinafter referred to and more particularly pointed out in the claims.

In the accompanying drawings forming part of this application, Figure 1 is a side elevation of the shoe as applied to use. Fig. 2 is a vertical longitudinal section produced through Fig. 1. Fig. 3 is a fragmentary sectional view disclosing more especially fastening means between the straps connected to the chain applied to the heel end of the shoe.

Referring to the drawings in which similar reference numerals designate corresponding parts throughout the several views, 1 indicates our improved shoe which is preferably in the form of a plate and shaped in general outline to fit the contour of the hoof of an animal, the toe and heel portions of the shoe being provided with fillets 2, through which extend calks 3, the lower ends of the calks being preferably provided with points 4, while the upper ends thereof are provided with heads 5, which rest on the upper surface of the shoe. In order to securely hold the calks and at the same time provide a cushioning surface for the hoof of the animal, a plate 6 conforming to the general outline of the shoe is placed over the heads 5 and secured about centrally to the shoe 1 by means of a rivet, or the like 7, thereby securely locking the calks in engagement with the shoe.

The shoe is attached to the hoof of the animal by providing clips 8 at the forward end of the shoe, which clips are placed an equal distance to each side of the center of the shoe and are connected together by means of a metal strap 9, the clips 8 being so inclined as to conform to the contour of the hoof of the animal, a standard 10 being attached to the metal strap 9 adjacent its longitudinal center, said standard having a threaded opening 11 therethrough.

At the center of the heel portion of the shoe is formed a loop 12, through which extends a chain 13, the opposite ends of the chain 13 being secured to metallic strips or bands 14 and 15, respectively, the strip 14 extending substantially two-thirds the distance around the hoof of the animal, while the strip 15 completes the connection between the strip 14 and the opposite end of the chain. The strips are locked together by means of a clevis 16 pivotally secured to the end of the strip 14, within which clevis is pivotally secured a latch frame 17, by means of pivot studs 16$^a$ projecting laterally and about centrally from said latch frame and received by the arms of said clevis at their free ends, the bar 18 at one end of the latch frame being adapted to engage hooks 19 at the free end of the strip 15. The opposite end of the latch frame is provided with a lever 20, by means of which said frame may be swung back and forth and the strips locked together or unlocked.

That portion of the trip 14 extending over the central portion of the hoof of the animal is provided with a standard 21, which standard is adapted to coöperate with the standard 10 and is provided with an opening 22, through which extends a bolt 23, said bolt being threaded and adapted to engage the threads in the opening 11, whereby when the bolt is rotated in one direction, the forward end of the shoe will be securely clamped on the hoof of the animal, the head 24 of the bolt having openings 25 therein, in which may be inserted any suitable form of instrument for rotating the screw.

To prevent the chain and strips to which the same is attached from injuring the hoof of the animal, any suitable form of shield 26 may be attached to the under side of the strips 14 and 15 said shield being of sufficient length to extend around the portion of the heel of the hoof against which the chain rests.

In applying the shoe to the hoof, the lever 20 is moved until it rests over the strip 14 when the shoe is properly positioned on the bottom of the hoof and the bar 18 engaged with one of the hooks 19 on the strip 15, after which the lever 20 is swung in the opposite direction until said lever rests over and engages the outer face of the strip 15. By so arranging the bar 18 as to rest in a plane above the pivotal point of the frame 17, when the latch frame is in its locked position, the tension of the strips will serve to hold the latch frame in its locked position and as the loop 12 is positioned at the center of the heel of the shoe the binding of the chain on the hoof will prevent the shoe from moving forwardly, while the bar 23 will securely hold the toe end of the shoe to the hoof.

By providing the bolt 23, the strip 14 may be moved toward or from the toe end of the shoe to adapt the same for hoofs of different heights and by providing a number of the hooks 19, the strips and chain to which the same are attached, may be likewise adjusted to fit hoofs of greater or less dimensions.

It will thus be seen that we have provided a very cheap and economical form of shoe and one that can be readily applied to use or removed when desired. It will likewise be seen that the attaching parts of said shoe may be readily adjusted to fit hoofs of various sizes. It will further be seen that when the calks become worn, the same may be readily removed by removing the rivet 7 and introducing a new set of the calks.

It will be readily apparent that this shoe can be very quickly applied to use and, if desired, can be extended over the usual form of shoe, as when the streets are slippery from ice or snow, thereby obviating the necessity of taking the animal to the blacksmith to have the calks sharpened and if desired, as soon as the snow or ice has been removed, our form of shoe may be removed until such time as occasion may require the use of the pointed calks.

What we claim is:

1. A removable horse shoe comprising the combination with a shoe having calks removably attached thereto and a plate to hold said calks in position, said shoe having clips at the forward end thereof and a loop at the rear end thereof; of a chain extending through said loop, metallic strips secured to said chain, one of said strips having hooks thereon, a clevis attached to the opposite strip, a frame pivoted to said clevis and having a bar adapted to engage the hooks on the opposite strip and means to adjust said strips toward or from the toe of the shoe to fit hoofs of various heights.

2. A horse shoe comprising the combination with the shoe proper, calks attached thereto, a plate above the shoe and fixed thereto, clips at the forward end of the shoe, said clips being connected by a strap, a standard fixed to said strap, and a loop at the rear end of the shoe; of a chain extending through said loop, strips connected to said chain, means to lock the strips together, a standard secured to one of said strips and a bolt extending through the standard on the strip and engaging the standard on said strap, whereby the strips may be moved from or toward the end of the shoe.

In testimony whereof we have signed our names to this specification in the presence of two subscribing witnesses.

CHARLES F. HYATT.
EDWARD W. MESSMER.

Witnesses:
HARRY E. NEGLEY,
LORETTA A. RIEGER.